United States Patent Office 3,363,425
Patented Jan. 16, 1968

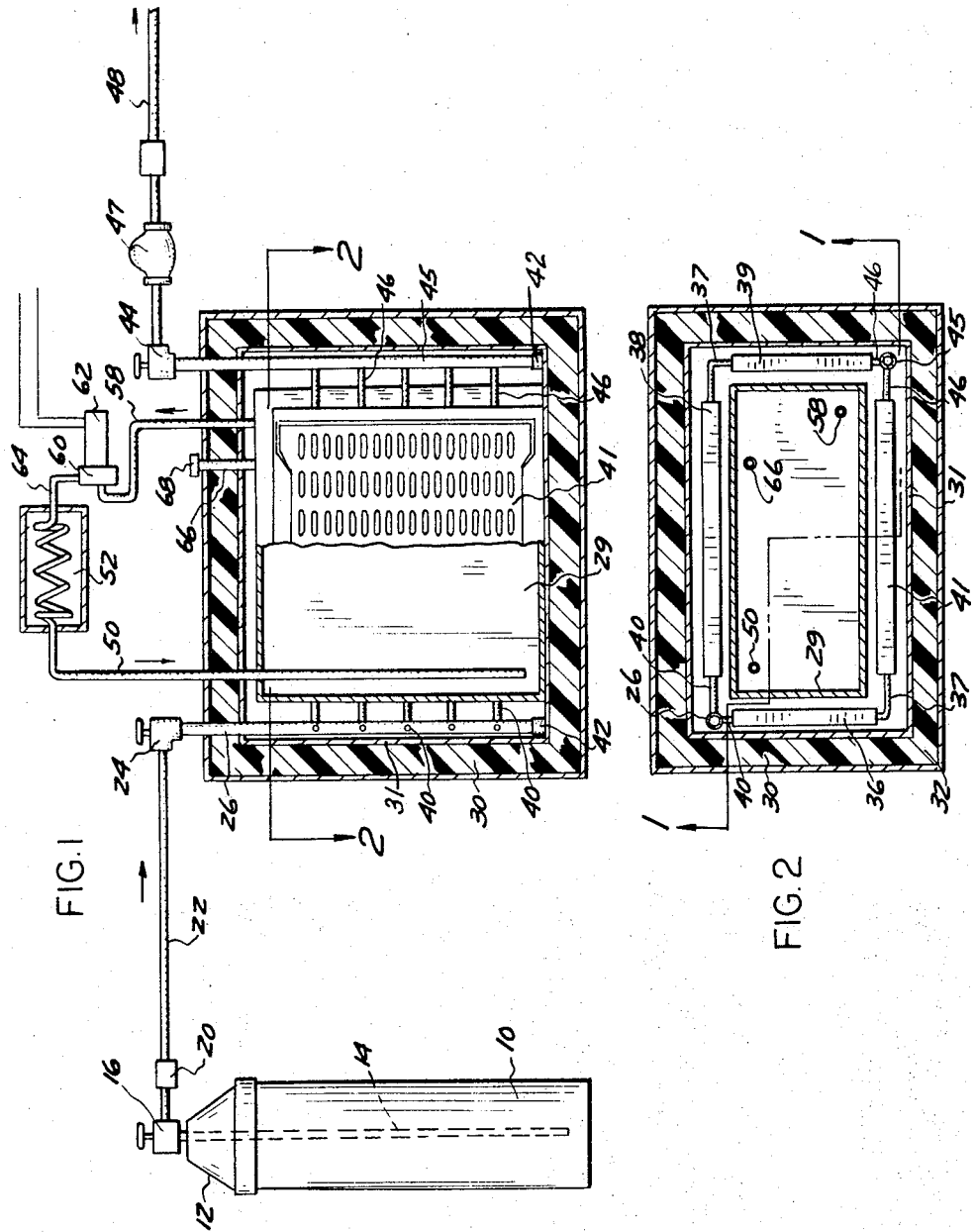

3,363,425
REFRIGERATION SYSTEM FOR VEHICLE POWERED BY LIQUIFIED PETROLEUM GAS
Robert H. Williamson, 17039 Dorset,
Southfield, Mich. 48075
Filed Apr. 6, 1966, Ser. No. 540,735
5 Claims. (Cl. 62—7)

ABSTRACT OF THE DISCLOSURE

A refrigeration system for a vehicle powered by liquified petroleum gas consisting of a heat hanger placed between the pressurized container of liquified petroleum gas and the carburetion system of the vehicle. The vaporization of the liquified petroleum gas flowing through capillary tubes into expansion chambers in the heat exchanger cools the refrigerant fluid of a closed loop refrigeration.

This invention relates to a system for employing the endothermic expansion of liquified petroleum gas for refrigerating a vehicle and for powering an internal combustion engine which drives the vehicle.

It is common practice to employ liquified hydrocarbon gases such as butane, propane, methane and the like as fuel for internal combustion engines which drive vehicles. These gases are liquified by pressure and stored in metal tanks. As the gas is released from the tank through some pressure reduction means, the liquid converts to the gaseous form and expands into a vapor suitable for use as fuel in a normal internal combustion engine. The expansion from the liquid to gaseous state requires the addition of fairly large quantities of heat to the gas. The broad purpose of the present invention is to provide apparatus which will provide the heat of expansion from another fluid which acts as a refrigerant in a closed loop refrigeration system wherein the cooler for the refrigerant forms parts of, or is physically closely associated with the expansion apparatus for the hydrocarbon gas.

As disclosed in the following detailed description of a preferred embodiment of the invention, the liquid petroleum gas is stored in a pressurized container which is connected by a plurality of small diameter capillary feed tubes to a series of heat exchanger plates disposed intermediate the inner and outer walls of a double walled container which will be termed the expansion and accumulator tank. The initiator pressure of the volume within the plates is appreciably lower than that of the pressurized fuel tank. The liquid fuel feeds through the capillary tubes into the heat exchanger plates at a very slow rate, severely limited by the small diameter of the tubes. As the liquid reaches the lower pressure volume of the plates, it expands to occupy the volume of the plates. This expansion requires heat which is supplied by a refrigerant media that is disposed with the accumulator tank. The refrigerant media circulates from a closed loop refrigeration system and is pumped out of the tank by a refrigerant pump to the refrigerant circuit. The gaseous hydrocarbon exchanges heat with the transfer media as the hydrocarbon circulates through the plurality of closed heat exchanger plates, and then passes through a pressure reducing valve which connects to the engine of the vehicle. The accumulator tank and transfer media thus perform the double function of vaporizing the previously liquid hydrocarbon and cooling the previously warm refrigerant medium by exchanging heat between the two.

The refrigerant circuit includes a series of closed refrigerant coils or plates which are disposed within a volume to be cooled, such as the passenger compartment of a vehicle or the storage compartment of a truck or alternatively in an enclosed volume which communicates with the volume to be cooled and through which forced air is passed, as by a blower. The refrigerant employed in the cycle may be any liquid having a generally high specific heat and low freezing temperature. One end of the cooling coil is connected to the input to the expansion and accumulator tank and the other end is connected to the output of the tank, through a recirculating pump. The liquid absorbs heat in the cooling coils and releases it to the hydrocarbon in the expansion and accumlator tank.

It is therefore seen to be a primary object of the present invention to provide a vehicle driven by an internal combustion engine from a pressurized liquid hydrocarbon fuel, wherein a refrigeration system for the vehicle provides heat for the vaporization of the liquid fuel from the cooling of a refrigerant medium.

Another object is to provide such a system wherein the refrigerant medium exchanges its heat with the liquid hydrocarbon in a heat exchanger to which the hydrocarbon is introduced through a plurality of capillary tubes.

Another object is to provide such a system wherein the expansion tank acts as a sump for the refrigerant system.

Other objects, advantages and applications of the present invention will be made apparent by the following detailed description of a preferred embodiment of the invention. The description makes reference to the accompanying drawings in which:

FIGURE 1 represents an elevational partially schematic sectional view taken along line 1—1 of FIGURE 2; and FIGURE 2 is a plan sectional view of the system taken along line 2—2 of FIGURE 1.

Referring to the drawings, the petroleum gas, such as methane, butane, or the like, may be stored in a liquified state, in the cylindrical pressure vessel 10, having a domed cover 12. An elongated output tube 14 extends axially from the upper end through the length of the container to a point adjacent the lower end thereof and connects to a manually operable shut-off valve 16 at its upper end, externally of the vessel. The output side of the valve 16 is connected to a quick release coupling 20 of any commercially available variety, and through the coupling to an output hose 22.

The far end of the output hose connects through a second manually operable shut-off valve 24 to a header pipe 26 which extends downwardly through the cover of a rectangular, sheet metal double walled expansion tank 28 intermediate an inner wall 29 and a pair of outer walls 30 and 31. The inner walls 29 form a closed six-sided chamber which acts as a heat exchanger volume and sump for the refrigerant as will be described. The header 26 extends vertically through the top cover of the tank to a point adjacent the lower end thereof and is closed off by a cap 31 at that end. The outer walls 30 and 31 of the tank 28 are of a sandwich construction with glass wool insulation 32 filling the interstices.

A plurality of short metal tubes 40 extend horizontally from the header 26 at regular intervals along its length and make connection therewith. These tubes may typically have an outer diameter of 0.087 inch and an interior diameter which restricts the flow through the tube that which occurs as a result of capillary attraction of the walls of the tube to the fluid. The number of these tubes and their spacing is a function of the fuel consumed by the engine being supplied.

The other ends of the tubes are connected to a pair of flat heat exchanger hollow plates 36 and 38 which extend through substantially the full height and width of the tank 26 between the walls 29 and 31. The plates 36 and 38 provide output at their opposite ends by means of tubes 37 to a pair of similar hollow plates 39 and 41 which extend around the other two sides of the tank 28. The plate 36 extends along the width of the tank and the plate 38 normally to the plate 36 along the length of the tank.

The extreme ends of the plates 39 and 41 connect to an output header tube 45 which is disposed vertically with its lower end closed by a cap 42 and with its output provided through a manual shut-off valve 44 outside of the tank. The connection between these ends of the heat exchanger plates 39 and 41 and the output header is made through a plurality of horizontal tubes 46 of a relatively substantial diameter so as to provide a relatively high volume flow of gas to the header.

The output of the shut-off valve 44 is provided to a pressure reducing vlave 47 which in turn feeds the engine (not shown) through a fuel line 48.

The tank 29 is normally filled with whatever refrigerant is being employed in the system through an input tube 50 which introduces the refrigerant in liquid form from the refrigerating cooling coils 52.

The output from the tank is made through a vertical tube 58, which passes through the top of the tank and makes connection to the input of a circulating pump 60 powered by an electric motor 62. The output tube 64 from the pump goes to the refrigerating or air conditioning unit 52. The tank 29 acts as a sump for the refrigerant. The refrigerant or transfer media, typically Prestone or other commercially available antifreeze liquid, is delivered into the tank 29 by a short filler tube 66 normally blocked by a plug 68.

The immediate connection between the expansion tank and the pressurized gas source is made by the capillary tubes 40. The flow restriction which these tubes represent allows a valveless connection thereby greatly increasing the reliability of the system. The liquid petroleum slowly expands to a gas as it passes along the heat exchanger plates 36, 38, 39 and 41 until it is completely gaseous at the output. The heat required for this expansion is drawn from the refrigerant. The dimensions and perimeters of the unit are dependent upon flow to the engine and the pressure of the source.

Having thus described my invention, I claim:

1. In a vehicle having in combination a container of pressurized liquified petroleum gas of a variety which is gaseous at atmospheric pressure, an internal combustion engine having a carburetion system with an intake capable of being fueled by the gaseous petroleum and a closed loop refrigeration system employing a refrigerant fluid, the improvement comprising a heat exchanger comprising hollow expansion plates for vaporization of said liquified petroleum gas, an inlet header connected to the container of liquified petroleum gas, an outlet header connected to the intake of the carbureton system of the internal combustion engine, inlet and outlet tubes connecting respectively the inlet header and the outlet header to the expansion plates, said inlet tubes consisting of a plurality of substantially short capillary tubes, and a tank for said refrigerant fluid disposed in close proximity with said expansion plates wherein the heat required for vaporization of said liquified petroleum gas is provided by the refrigerant fluid thereby cooling said fluid.

2. The improvement of claim 1 wherein the heat exchanger is enclosed in an enclosure having an inner wall and an outer wall and an insulating material sandwiched between said walls.

3. The improvement of claim 1 wherein said expansion plates are disposed around said refrigerant fluid tank.

4. The improvement of claim 1 wherein the outlet header of said heat exchanger is connected to the intake of the carburetion system of the internal combustion engine through an expansion valve.

5. The improvement of claim 1 wherein the refrigerant tank acts as a sump for the refrigeration system and wherein the refrigerant fluid is removed from said tank by a circulating pump disposed in said refrigeration system.

References Cited
UNITED STATES PATENTS

| | | | |
|---|---|---|---|
| 1,905,971 | 4/1933 | Davisson | 62—7 |
| 2,183,452 | 12/1939 | Gibbs | 62—434 |
| 2,538,016 | 1/1951 | Kleist | 62—434 |

WILLIAM J. WYE, *Primary Examiner.*